W. V. TURNER.
SPEED CONTROLLED BRAKE RELEASE DEVICE.
APPLICATION FILED JUNE 6, 1911.
1,078,019.  Patented Nov. 11, 1913.
2 SHEETS—SHEET 2.
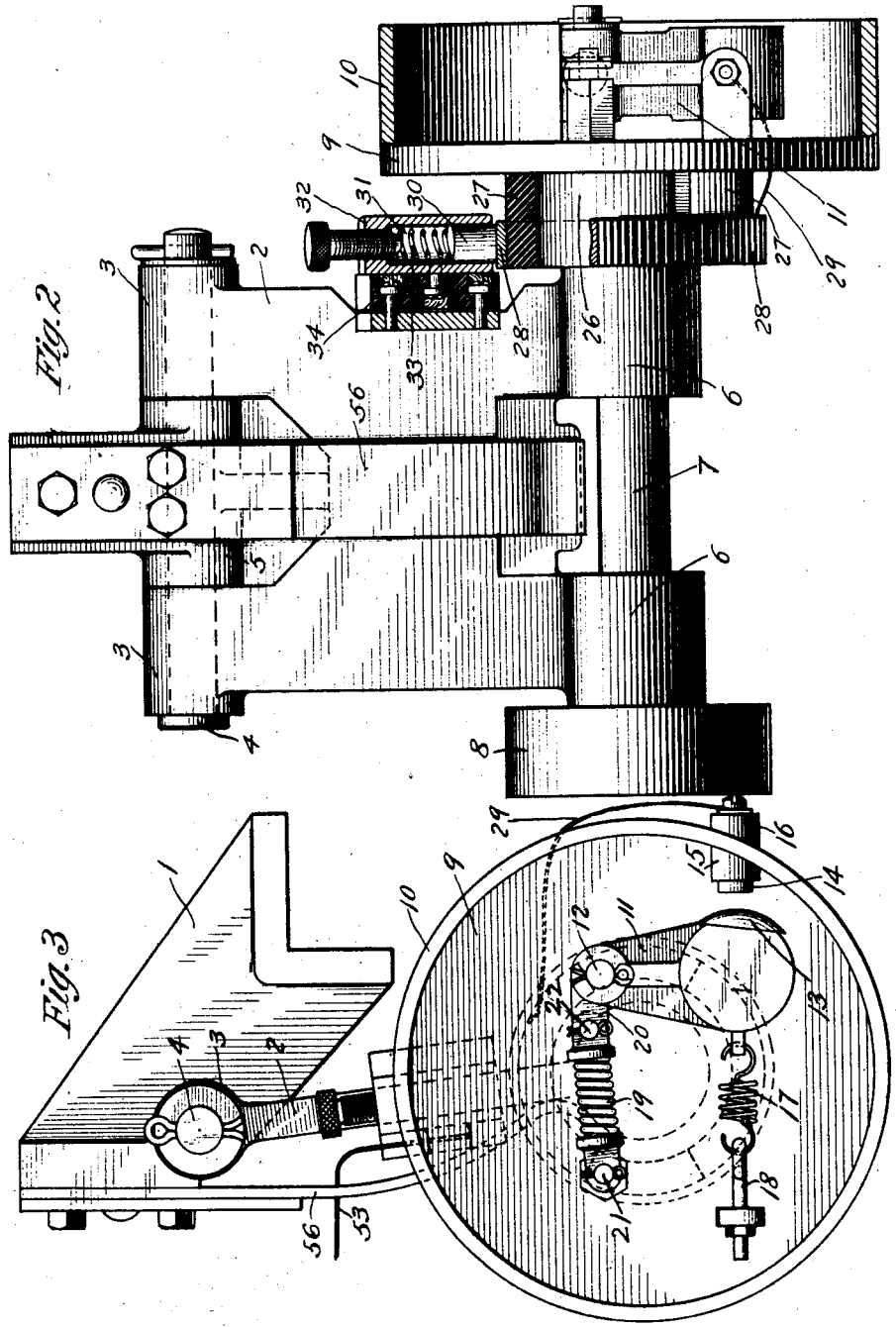
WITNESSES
INVENTOR
Walter V. Turner
by Wm. M. Cady
Att'y.

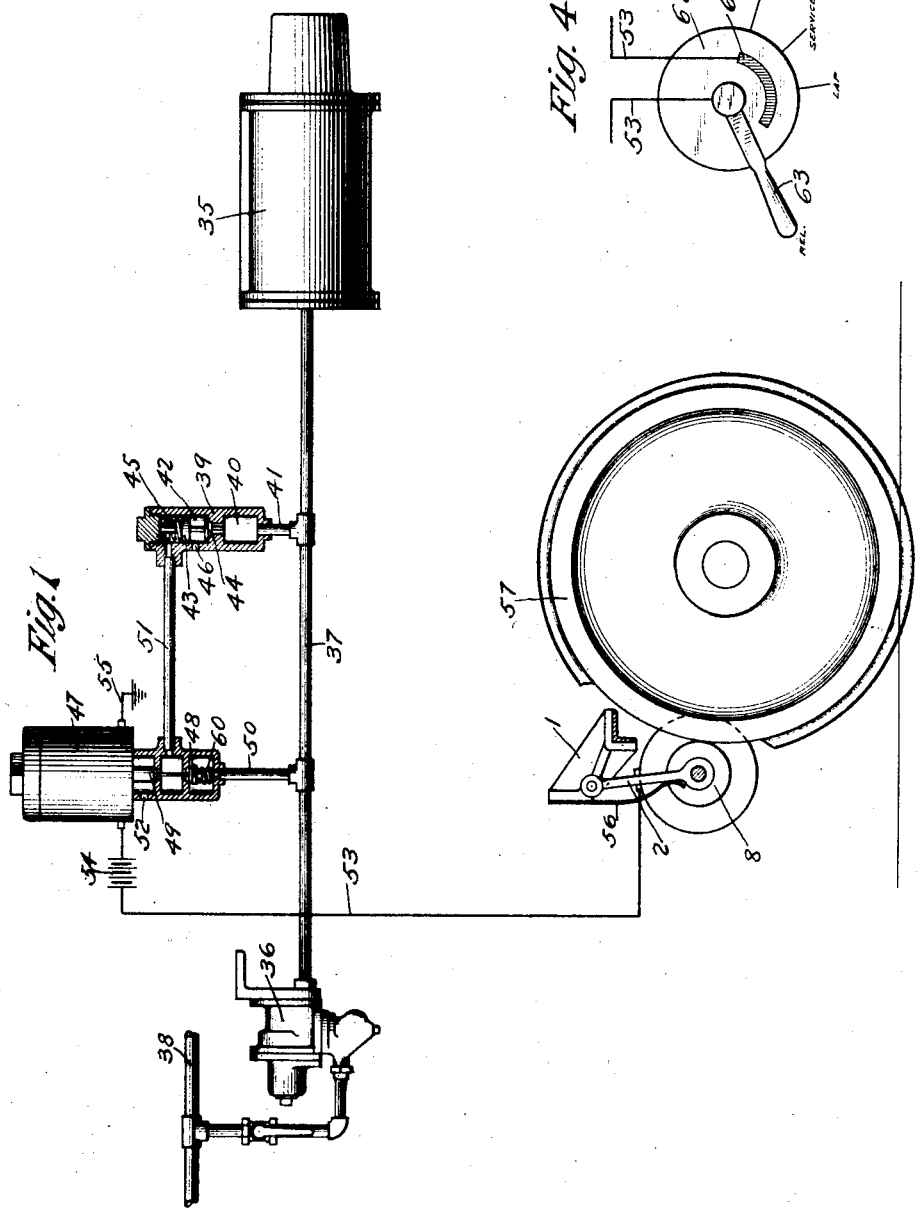

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF PITTSBURGH, PENNSYLVANIA, A CORPORATION OF PENNSYLVANIA.

SPEED-CONTROLLED BRAKE-RELEASE DEVICE.

1,078,019.  Specification of Letters Patent.  Patented Nov. 11, 1913.

Application filed June 6, 1911. Serial No. 631,650.

*To all whom it may concern:*

Be it known that I, WALTER V. TURNER, a citizen of the United States, residing at Edgewood, in the county of Allegheny and State of Pennsylvania, have invented new and useful Improvements in Speed-Controlled Brake-Release Devices, of which the following is a specification.

This invention relates to fluid pressure brakes, and more particularly to a mechanism for regulating the braking pressure according to the speed of the vehicle.

While it has been demonstrated that the retarding friction of a brake shoe upon a moving wheel is less at high speeds than at low speeds, it has more recently been found that due to a variety of other causes, the effect of the continually increasing friction between brake shoe and wheel as the speed is reduced is modified in such manner that the friction does not actually vary to any considerable extent from the beginning of the application of the brake shoe to the wheel until near the end of the stop, when the speed is quite low. On this account, it is highly desirable in an application of the brakes, where it is desired to stop the train in the shortest possible distance, that the braking pressure be fully maintained until near the end of the stop when the speed has been reduced to a low rate, say two and one-half to three miles per hour According to Patent No. 739,918, granted on September 29, 1903 to R. A. Parke, an inertia governor is provided which is adapted to control the release of air from the brake cylinder when the rate of retardation exceeds a predetermined degree, the principle of operation being to utilize the inertia of a body which is adapted to move independently of the vehicle, so that if the rate of retardation exceeds a predetermined degree, then the inertia of said body causes the same to move relatively to the vehicle and this movement is employed to effect the operation of a valve for releasing air from the brake cylinder.

With a mechanism of the above character, as the same depends for operation upon a certain change in the rate of retardation, it has been found that the governor is sometimes liable to operate at a high rate of speed, where the change in the rate of retardation is sufficiently rapid, so that air is then released from the brake cylinder at a time when it is desired to hold the air therein.

The principal object of my invention is to provide means governed by the speed of the train or vehicle for regulating the brake cylinder pressure which is adapted to release fluid from the brake cylinder only when the speed of the vehicle has been reduced to a predetermined low degree. By this means, the braking pressure is positively maintained during the time that the train is being brought to a stop, until near the end of the stop when the speed has dropped to a low degree, and then fluid is quickly released from the brake cylinder so that shocks and abrupt stops are avoided as the train comes to a standstill.

In the accompanying drawings; Figure 1 is a diagrammatic view of a car air brake equipment with my invention applied thereto; Fig. 2 a front elevational view, partly in section, of the speed controlled mechanism; Fig. 3 a side elevation thereof; and Fig. 4 a plan view of a brake valve provided with contacts employed in connection with a slightly modified form of my invention.

As shown in detail in Figs. 2 and 3, the speed controlled mechanism may comprise a suitable support of any desired form, such as a bracket 1 adapted to be secured to the wheel truck frame, and a frame 2 provided with bearings 3 for a pin 4 which is mounted in a hub 5 carried by the bracket 1, so that when the parts are assembled and the pin 4 is passed through the bearings 3 and the hub 5, the frame 2 is adapted to have a swinging movement. At the lower end, the frame 2 is provided with bearings 6 for a shaft 7 and secured to one end of said shaft is a friction wheel 8 adapted to engage the tread of one of the vehicle wheels. On the opposite end of the shaft 7 is secured a disk 9 having a cylindrical flange 10. An arm 11 is mounted on a pin 12 within the central space formed by the flange 10 and said arm is provided with a contact piece 13 adapted upon an outward swinging movement of the arm 11 to engage a contact member 14 secured to the flange 10 but insulated therefrom by blocks of insulation 15 and 16.

A heavy coil spring 19 is pivotally connected at one end to an arm 20 secured to the upper end of the arm 11 and the opposite end of the spring is pivotally secured to the disk 9. When installed in position, the spring 19 is under compression and the pivot connection to the arm 20 is so located that with the arm 11 in its inner position, the same is out of alinement with the center line of the pin 12 and the pivot 21, and consequently said spring tends to maintain the arm 11 in its inner position. If, however, the arm 11 is moved outwardly a sufficient distance, so that the pivot pin 22 crosses said center line, then the spring acts to throw the arm 11 outwardly against the contact 14. By this means the governor is caused to act at a more sharply defined critical speed and a quick snap-like action in making and breaking the electric circuit is secured.

To the lower weighted end of the arm 11 is attached one end of a coil spring 17, having its opposite end secured to an adjusting hook 18 secured to the disk 9. This spring resists the outward movement of the arm 11 and may be adjusted so as to vary the pressure required to throw the arm out.

On the hub 26 of the disk 9 are attached a number of segments 27 of suitable insulating material and mounted on said segments is a conducting ring 28, connected by a wire or conductor 29 to the contact 14. Adapted to bear on said ring is a contact 30, loosely mounted in a recess 31 of a block 32. An adjustable spring 33 is adapted to yieldingly press the contact 30 against the ring 28. The block 32 is secured to the frame 2 with a block of insulation 34 interposed between the frame and the block 32.

Referring to Fig. 1 of the drawings, an air brake equipment is shown, having the usual brake cylinder 35, triple valve device 36, connected by pipe 37 to the brake cylinder, and train pipe 38. According to my invention, a valve device is provided comprising a casing 39 having a chamber 40 connected by pipe 41 to the brake cylinder pipe 37 and having a piston chamber 42 containing a piston 43 for operating a valve 44. The piston 43 is subject on one side to the pressure of a spring 45 and the chamber at the opposite side is open to the atmosphere through a port 46, so that when the valve 44 is opened, air may be released from the brake cylinder 35.

A magnet controlled valve mechanism is also provided, comprising a magnet 47 and oppositely seating and connected valves 48 and 49 adapted to be controlled by said magnet. When the valve 48 is open, communication is established from the brake cylinder pipe 37 through pipes 50 and 51 to the spring chamber of the piston 43 and when the valve 49 is open said spring chamber is connected to an exhaust port 52. A wire 53 leads from the contact block 32 to one terminal of the magnet 47 and has a source of current 54 connected therein. The other terminal of the magnet is connected by wire 55 to ground.

In order to yieldingly press the friction wheel 8 against the vehicle wheel 57, a flat spring 56 may be provided, which is secured at one end to the bracket 1 and has its other end adapted to bear against the frame 2.

The operation is as follows: When the vehicle is in motion, the friction wheel 8 is rotated by contact with the vehicle wheel 57 and the centrifugal governor arm 11 tends to move out and cause the contacts 13 and 14 to engage. The resistance of the governor springs and the weight of the arm 11 are such that when the speed of the vehicle exceeds a certain low speed the arm moves out to effect the engagement of the contacts 13 and 14. This speed is preferably between two and one-half and three miles per hour. If the train speed exceeds the rate determined upon as above, the centrifugal governor causes the contacts 13 and 14 to engage and a circuit is established through the wire 53 and magnet 47, the circuit being connected to ground through the arm 11 and the car truck. The magnet 47 is thus energized and the valve 49 is closed while the valve 48 is opened. Upon making an application of the brakes, air is supplied to the brake cylinder through pipe 37 and air also flows through pipe 50 past the open valve 48 and through pipe 51 to the piston 43. The fluid pressure together with the pressure of the spring 45 then acts on piston 43 and maintains the valve 44 seated. The valve 44 is thus held seated during an application of the brakes so long as the speed of the vehicle exceeds a predetermined rate, but when the speed has been reduced to or slightly below said rate, the arm 11 operates to separate the contacts 13 and 14 and the circuit of the magnet 47 is thus broken. The valve 48 is thereupon closed by the spring 60 and the valve 49 is opened. Air is then vented from the piston 43 by way of the exhaust port 52 and the valve 44 opens to release fluid from the chamber 40 and the brake cylinder 35. The relief port 46 is preferably of large capacity, so that the brake cylinder pressure may be rapidly reduced and thus objectionable shocks and bunching is prevented as the train comes to a stop. While, if desired, substantially all of the fluid may be released from the brake cylinder by the operation of the relief valve mechanism, I prefer to employ the spring 45 to act on the piston 43, so as to close the valve 44 upon the reduction in brake cylinder pressure to a predetermined degree, for example, the spring 45 may be such that the valve 44 is closed when the brake cylinder pressure has reduced to 15 pounds.

It will be noted that when the train is running at ordinary speeds the circuit of the magnet 47 is closed and consequently, electrical energy is being used a large part of the time. In order to minimize the consumption of electrical energy, the circuit wire 53 may be connected to contacts in the brake valve, so that the circuit can only be completed when the brake valve is in a brake application position. As shown in Fig. 4, this may be accomplished, by providing a contact 61 in brake valve 62 which is connected to wire 53, and a contact carried by the brake valve handle 63 and adapted in brake applying positions of the brake valve to engage with the contact 61 and thus complete the circuit through the wire 53. It will thus be seen, that in the normal running or release position of the brake valve, the circuit is open and no current is wasted, while upon turning the brake valve to an application position the circuit is closed.

It will now be evident that with the above described apparatus, the brake cylinder pressure will be retained in the brake cylinder regardless of the rate of retardation, and that fluid is only released from the brake cylinder when the speed has been reduced to a low degree near the end of the stop.

Having now described my invention, what I claim as new and desire to secure by Letters Patent, is:—

1. In a vehicle brake apparatus, the combination with a mechanism for applying the brakes, of means adapted upon a reduction in speed of the vehicle to a predetermined low rate immediately preceding a stop for suddenly relieving the braking pressure.

2. In a fluid pressure brake apparatus, the combination with a valve device having a large port for releasing air from the brake cylinder, of a speed governed device operated by a rotating part of the car and at a predetermined low rate of speed thereof but before said part ceases to rotate for suddenly effecting the operation of said valve device to thereby quickly relieve the braking pressure.

3. In a fluid pressure brake apparatus, the combination with a brake cylinder, of a valve for controlling the release of air from the brake cylinder, a piston for operating said valve, an electrically controlled valve mechanism adapted to normally supply fluid to said piston while the brakes are applied, and a speed governed device adapted at a predetermined rate of speed to operate said electrically controlled valve mechanism and release fluid from said piston.

4. In a fluid pressure brake apparatus, the combination with a brake cylinder, of a valve for controlling the release of air from the brake cylinder, a piston for operating said valve, an electrically controlled valve mechanism adapted to normally supply fluid to said piston while the brakes are applied, and a speed governed device for controlling the circuit of said electrically controlled valve mechanism and adapted at a certain low rate of speed to open the circuit and cause said valve mechanism to vent air from said piston.

In testimony whereof, I have hereunto set my hand.

WALTER V. TURNER.

Witnesses:
 A. M. CLEMENTS,
 B. A. OLIVER.